US007526530B2

(12) United States Patent
Thomason

(10) Patent No.: US 7,526,530 B2
(45) Date of Patent: Apr. 28, 2009

(54) SYSTEM AND METHOD FOR CACHEING WEB FILES

(75) Inventor: Lee Thomason, Albany, CA (US)

(73) Assignee: Adobe Systems Incorporated, San Jose, CA (US)

( * ) Notice: Subject to any disclaimer, the term of this patent is extended or adjusted under 35 U.S.C. 154(b) by 186 days.

(21) Appl. No.: 11/429,380

(22) Filed: May 5, 2006

(65) Prior Publication Data

US 2007/0260701 A1 Nov. 8, 2007

(51) Int. Cl.
*G06F 15/16* (2006.01)
(52) U.S. Cl. .......................................... 709/217; 707/10
(58) Field of Classification Search ................ 709/206, 709/223, 241; 713/176, 180, 169, 156; 380/37, 380/54
See application file for complete search history.

(56) References Cited

U.S. PATENT DOCUMENTS

| | | | | |
|---|---|---|---|---|
| 5,995,624 | A * | 11/1999 | Fielder et al. ............... | 713/169 |
| 6,263,434 | B1 * | 7/2001 | Hanna et al. ................ | 713/156 |
| 6,285,991 | B1 * | 9/2001 | Powar ......................... | 705/76 |
| 6,611,598 | B1 * | 8/2003 | Hayosh ....................... | 380/54 |
| 6,816,969 | B2 * | 11/2004 | Miyazaki et al. ............ | 713/180 |
| 6,820,255 | B2 * | 11/2004 | Babaian et al. ............. | 717/151 |
| 6,976,165 | B1 * | 12/2005 | Carpentier et al. .......... | 713/165 |
| 7,080,259 | B1 * | 7/2006 | Nakanishi et al. ........... | 713/193 |
| 7,139,910 | B1 * | 11/2006 | Ainsworth et al. .......... | 713/155 |
| 7,231,458 | B2 * | 6/2007 | Tenereillo et al. ........... | 709/241 |
| 2002/0176572 | A1 * | 11/2002 | Ananth ........................ | 380/37 |
| 2002/0184333 | A1 | 12/2002 | Appelman | |
| 2003/0105716 | A1 | 6/2003 | Sutton, Jr. et al. | |
| 2004/0010553 | A1 * | 1/2004 | Katz et al. .................... | 709/206 |
| 2004/0143739 | A1 * | 7/2004 | de Jong ....................... | 713/176 |
| 2005/0009599 | A1 | 1/2005 | Ryan et al. | |
| 2005/0089160 | A1 * | 4/2005 | Crispin et al. ................ | 380/28 |
| 2005/0131900 | A1 * | 6/2005 | Palliyll et al. ................ | 707/10 |
| 2005/0188216 | A1 | 8/2005 | Crispin et al. | |
| 2006/0075246 | A1 * | 4/2006 | Suga ........................... | 713/176 |
| 2006/0095521 | A1 * | 5/2006 | Patinkin ...................... | 709/206 |
| 2006/0117182 | A1 * | 6/2006 | Wolff .......................... | 713/176 |
| 2006/0182133 | A1 * | 8/2006 | Choumaru et al. .......... | 370/401 |
| 2006/0184656 | A1 * | 8/2006 | Roddy ......................... | 709/223 |
| 2006/0193159 | A1 * | 8/2006 | Tan et al. ...................... | 365/49 |
| 2007/0143618 | A1 * | 6/2007 | Sperry ......................... | 713/176 |
| 2007/0204003 | A1 * | 8/2007 | Abramson ................... | 709/217 |

OTHER PUBLICATIONS

Bruce Schneier, Applied Cryptography: Protocols, Algorithms, and Source Code in C, (Wiley, 2nd ed. 1996) ISBN: 0-471-11709-9.
Vu, "Notification of Transmittal of the International Search Report and the Written Opinion of the International Searching Authority, or the Declaration", PCT/US2007/068297 dated Jul. 11, 2008, to be published by the USPTO (14 pages).

* cited by examiner

*Primary Examiner*—Thong H Vu
(74) *Attorney, Agent, or Firm*—Fish & Richardson P.C.

(57) ABSTRACT

A system and method receives a request for a file containing an identifier of the requested file and a message digest, containing an expected hash result of the requested file. The system and method identifies whether it has already stored a file having that identifier and a hash result matching the message digest. If so, the file is provided, optionally after being checked for authenticity via rehashing and comparing again to the message digest. If the file is not stored in the cache, it may be retrieved from a location included in the identifier, hashed and compared to the message digest to authenticate it, and provided to the requesting program if the hash result matches the message digest.

21 Claims, 2 Drawing Sheets

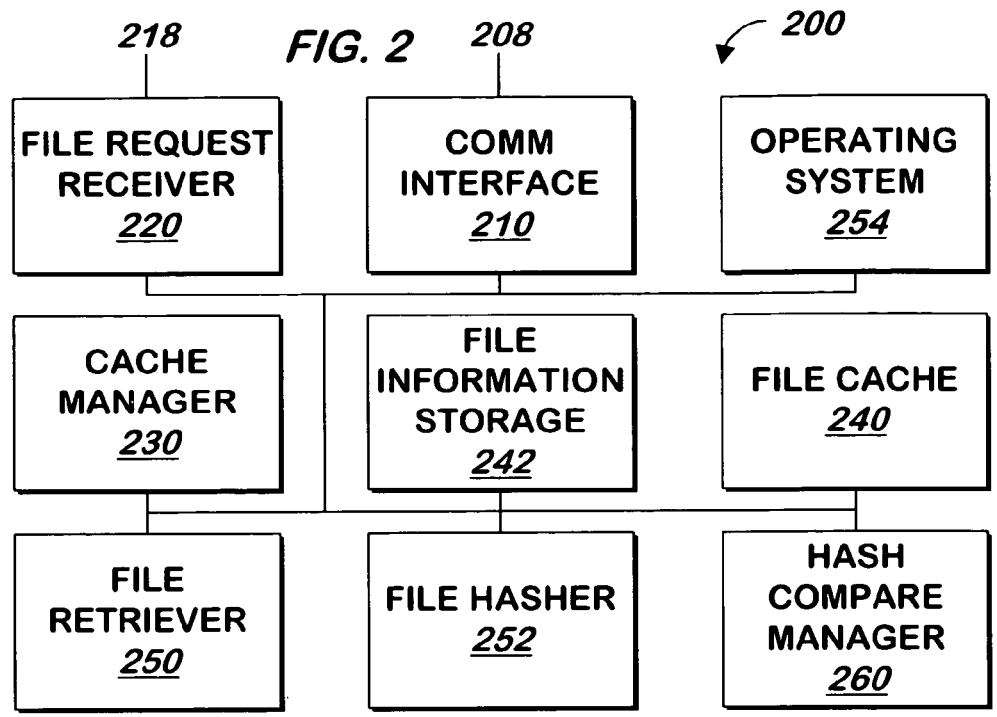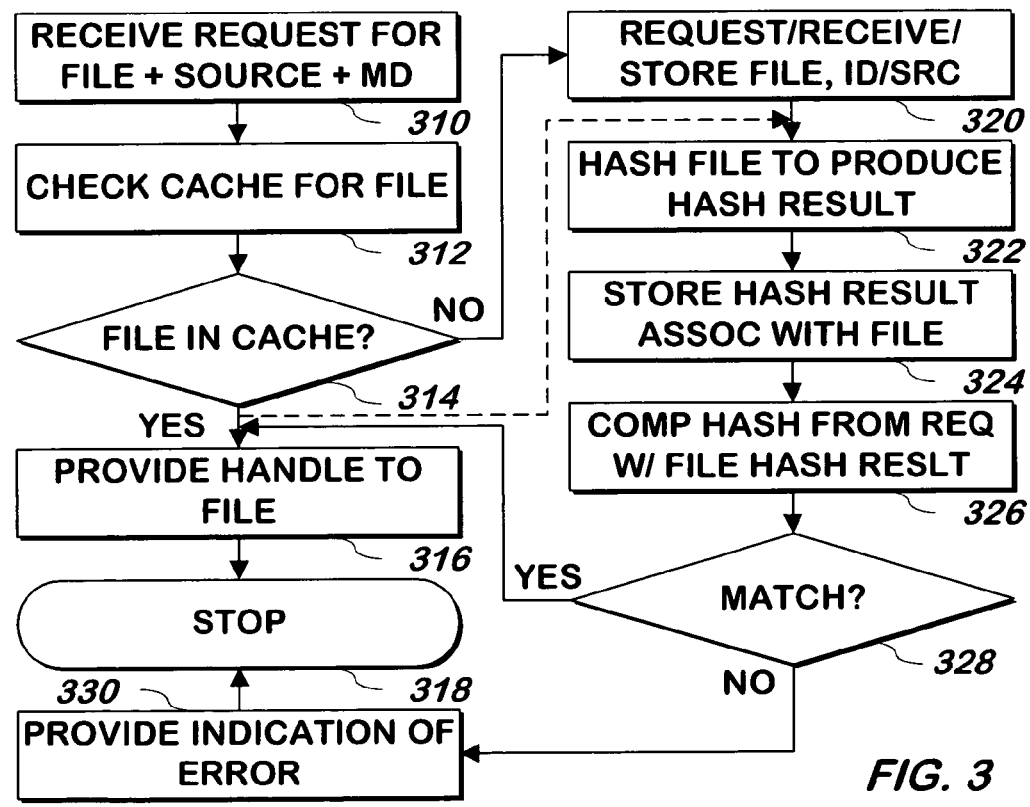

SYSTEM AND METHOD FOR CACHEING WEB FILES

FIELD OF THE INVENTION

The present invention is related to computer software and more specifically to computer software for cacheing of web files.

BACKGROUND OF THE INVENTION

Many conventional programs retrieve files over the Internet. To save the time of retrieval of the same file over and over again, many computer systems store the files they retrieve into a cache, and subsequent retrievals are first attempted from the cache. When a system employs a cache, if the computer system receives a request for a file, it first checks the cache. If the file is in the cache, the computer system retrieves the file from the cache. Because the retrieval of a file from a local hard drive can be much faster than retrieving the file from the Internet or other network, the retrieval of the file from the cache can significantly speed the retrieval of a file. If the file is not in the cache, the file is retrieved from the Internet.

However, conventional caching systems are neither secure nor precise. If the requested file has been corrupted, by a malicious party for example, the cache may not detect the corruption and will supply the file. If a new version of the file is available with the same name, the caching system will not distinguish the versions and can supply the older version.

Some conventional browsers attempt to resolve this problem by only retrieving files from a cache if the file was originally retrieved from the same Internet domain as the file or program corresponding to the source of the request. Although this can help prevent the problems of corruption or version incompatibility, it results in slower download times because files in the cache are downloaded again. It also does not detect the corruption of a file or an incorrect version.

What is needed is a system and method for caching files that supply files from a cache having an original source of any domain, but can detect the corruption or the storage of an incorrect version of the file in the cache and supply the uncorrupt file or requested version, even if another version having the same file name is stored in the cache.

SUMMARY OF INVENTION

A system and method allows a program to request a file using a hash result and network location of the file. The system and method references the files in the cache and identifies whether any file stored in the cache has that hash result. If so, the system and method provides the file from the cache. If not, the system and method retrieves the file from the network location, hashes the file, and stores the file associated with the hash result, and optionally the network location from which the file was retrieved, for use as described above. The hash result is checked against the hash result in the request. If the hash results match, the system and method provides the file and if not, the system and method provides an indication that the requested file is unavailable.

BRIEF DESCRIPTION OF THE DRAWINGS

FIG. 2 is a block schematic diagram of a system for providing requested files according to one embodiment of the present invention.

FIG. 3 is a flowchart illustrating a method of a method of providing requested files according to one embodiment of the present invention.

DETAILED DESCRIPTION OF A PREFERRED EMBODIMENT

Figure 1:
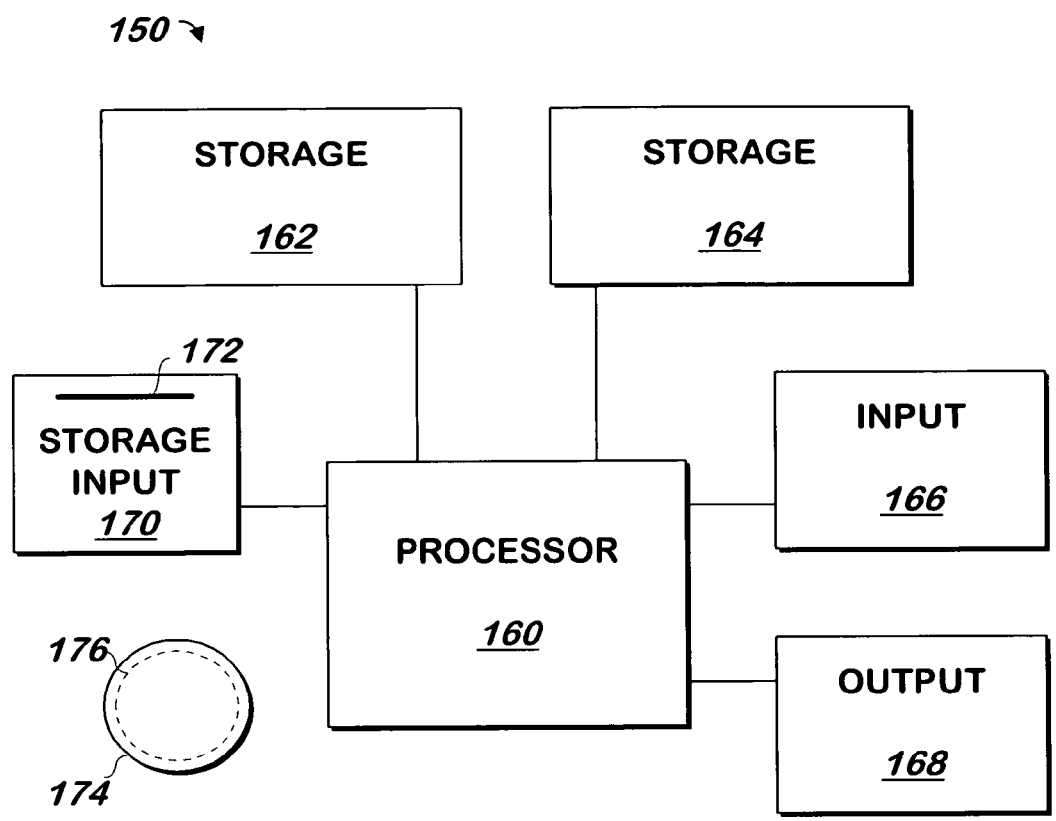
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Receive Request.

Referring now to FIG. 2, file request receiver 220 receives a file request from the program. The request includes the message digest of the requested file, which is an expected value of a result from hashing the file using a conventional hash function. The request also includes the source of the requested file, which may be in the form of a URL specifying the location from which the file may be obtained. When file request receiver 220 receives the file request from the program, file request receiver 220 determines if it can provide the file to the program. To do so, file request receiver 220 sends the message digest to cache manager 230.

Check Cache.

When cache manager 230 receives the message digest from file request receiver 220, cache manager 230 determines if the requested file is listed in file information storage 242 as being stored in file cache 240. To determine if the requested file is listed in file. information storage 242, cache manager 230 compares the message digest received from file request receiver 220 with the hash results in file information storage 242 and, using any conventional technique, searches for a match between the message digest of the requested file and a hash result in file information storage 242. File information storage 242 may be either disk or memory storage or both and may contain a conventional database. such as an internal list of records denoting which files are stored in file cache 240. The records in file information storage 242 are arranged such that a hash result of a file is associated with the filename of that file, which may be any unique identifier of the file. In one embodiment, the filename of the file may be the URL of the file specifying the location of the file from which it was retrieved. In one embodiment, cache manager 230 searches file information storage 242 for a matching hash result by starting at the top of the list of records in file information storage 242 and comparing the message digest of the requested file to each hash result on the internal list maintained by file information storage 242. If a hash result does not match the message digest of the requested file, cache manager 230 proceeds to the next hash result in the list until cache manager 230 finds a match to the message digest of the requested file or reaches the end of the list of hash results in file information storage 242. In other embodiments, file information storage 242 is sorted by hash results, and cache manager 230 uses a binary search algorithm to attempt to locate the hash result matching the message digest.

In one embodiment, files in file cache 240 to which the requested file is being checked against can originate from different Internet domain sources. Such files will have been stored in file cache 240 through various operations of system 200.

Provide a Handle to the File or an Error Message.

If cache manager 230 finds a match between the message digest of the requested file and a hash result stored in file information storage 242, cache manager 230 obtains from file information storage 242 the source identifier associated with the hash result from file information storage 242. When cache manager 230 receives the filename associated with the hash result matching the message digest of the requested file, cache manager 230 retrieves the handle to the file from file cache 240 using operating system 254 or the database. To retrieve the handle to the file in file cache 240, cache manager 230 requests a handle from operating system 254 for the file located in file cache 240 that matches the name of the file it located as described above. File cache 240 may be disk or memory storage or both. Operating system 254 provides cache manager 230 with the handle of the file in file cache 240 matching the message digest provided by file request receiver 220. Cache manager 230 provides the handle of the requested file to file request receiver 220.

In one embodiment, when file request receiver 220 receives the handle to the requested file from cache manager 230, file request receiver 220 provides the handle to the program requesting the file. In another embodiment, file request receiver 220 instead causes the file to be hashed again as described below, and then attempts to authenticate the file as described below. If the file is determined to be authentic, file request receiver 220 provides the handle to the file to the program requesting the file. If the file is determined not to be authentic as described below, file request receiver 220 treats the situation in the same manner as if cache manager 230 had not located a match between the message digest of the requested file and any of the hash results listed in requested file information storage 242, as described in more detail below, causing an attempt to be made to retrieve the file as described in more detail below.

If cache manager 230 does not find a match between the message digest of the requested file and any of the hash results listed in file information storage 242, cache manager 230 returns to file request receiver 220 a message indicating that the requested file could not be found in file information storage 242. When file request receiver 220 receives such a message from cache manager 230, file request receiver 220 proceeds to retrieve and authenticate the file as described below.

It is noted that file information storage 242 may contain the hash results and identifiers of files from different Internet domains. When cache manager 230 determines whether there is a match between the hash results stored in file information storage 242 and the message digest it receives, it may compare the message digest with the hash results of many previously stored files, downloaded from a number of different Internet domains.

If the File is not in the Cache, Retrieve and Store the File.

When file request receiver 220 receives an indication from cache manager 230 that the file is not in file cache 240, file request receiver 220 proceeds to retrieve the file from the source of the file. To do so, file request receiver 220 provides file retriever 250 with the source of the requested file received in the original request as described above. File retriever 250 uses communication interface 210 to retrieve the file from a local or network location specified in the source of the file, using conventional file retrieval methods. In one embodiment, communication between the network and system 200 is made via input/output 208 of communication interface 210 which is coupled to a network such as the Internet or a local area network or both. Communication interface 210 is a conventional communication interface that supports TCP/IP, Ethernet, and/or other conventional communication protocols.

When file retriever 250 retrieves the file from the network location specified by the source of the file, file retriever 250 uses operating system 254 to store the file in file cache 240 using a name or other unique identifier assigned by file retriever 250. In one embodiment, the unique identifier for the file stored in file cache 240 is the URL of the location of the file from which it was received, which is referred to herein as the source of the file. File retriever 250 receives a handle from operating system 254 for the retrieved file stored in file cache 240.

Hash the File and Associate the Hash Result with the File

To ensure that the file retrieved is the file requested, file retriever 250 provides the handle of the retrieved file in file cache 240 to file hasher 252. When file hasher 252 receives the handle of the retrieved file, file hasher 252 reads the file and hashes the file using conventional hashing techniques. In one embodiment, the hash function used to hash the file is any cryptographically secure hash function such as the SHA-1 hash function. A cryptographically secure hash function is a hash function with a large number of potential hash results, and for which small changes to the input to the hash function is highly likely to produce a different hash result. The SHA-1 hash function and others are described in Schneier, *Applied Cryptography* (Wiley, 2d ed. 1996) ISBN: 0-471-11709-9. The hashing of the retrieved file by file hasher 252 produces a hash result, which file hasher 252 returns to file retriever 250.

When file retriever 250 receives the hash result from file hasher 252, file retriever 250 stores the hash result of the retrieved file and the unique identifier of the retrieved file into file information storage 242 so that file information storage 242 will include the hash result and associated unique identifier in its internal database for use as described above.

File retriever 250 provides file request receiver 220 with the handle of the retrieved file and the hash result of the retrieved file to allow file request receiver 220 to authenticate the retrieved file and ensure that the retrieved file matches the file requested by the program.

Authenticate the File

To authenticate the retrieved file and ensure that it matches the file requested by the program, file request receiver 220 sends a compare request to hash compare manager 260 that includes the hash result of the retrieved file and the message digest of the requested file. When hash compare manager 260 receives the compare request, hash compare manager 260 compares the hash result of the retrieved file and the message digest of the requested file and determines if the two elements match each other. If the two elements match each other, hash compare manager 260 signals file request receiver 220 with the indication that the file retrieved is the file requested. If the two elements do not match each other, hash compare manager 260 signals file request receiver 220 with an error message indicating that the file retrieved does not match the file requested.

Provide a Handle to the File or an Error Message.

File request receiver 220 receives from hash compare manager 260 either the message indicating that the requested file is the retrieved file or the message indicating that the requested file is not the retrieved file. If file request receiver 220 receives an indication that the requested file is the retrieved file, file request receiver 220 provides the program from which it received the request with the handle to the file retrieved now located in file cache 240. If file request receiver 220 receives the error message stating that the retrieved file does not match the requested file, file request receiver 220 signals the program with an error message indicating that the file is not available.

The program receives either the handle to the requested file or an error message indicating that the requested file is not available. If the program receives the handle of the requested file, the program can read the file from file cache 240 via operating system 254 and continues running until terminated. If another file is requested, the process described above is repeated. If the program receives an error message indicating that the requested file is not available, the program either continues running without the file or terminates.

In one embodiment, the program that is using the file displays the output in a browser window. The program may be a browser or a plug-in to the browser such as a Flash Player application.

Referring now to FIG. 3, a request is received for a file 310. The request may include the source of the requested file and the message digest of the requested file. The cache is checked for the requested file 312 as described above. If the requested file is located in the cache 314, in one embodiment, the handle to the requested file located in the cache is provided to the entity from which the request for the file was received 316 and the method terminates 318. Otherwise 314, the method continues at step 320. In another embodiment indicated by the dashed line in FIG. 3, if the requested file is located in the cache 314, the method continues at step 322.

The requested file is retrieved and stored in the file cache or other file storage device with a unique identifier and associated with its source 320. The retrieved file is hashed to produce a hash result 322. The hash result is associated with the retrieved file and stored associated with the file 324. The hash result of the retrieved file is compared with the message digest of the requested file 326. If the hash result of the retrieved file and the message digest of the requested file are a match 328, the method continues at step 316 as described above.

If the hash result of the retrieved file and the message digest of the requested file do not match 328, an indication of error is provided to the program 330 and the method terminates 318.

The system and method may thus be used to provide a file received from one Internet domain to a program that has been downloaded from another Internet domain. The message digest in the request can help ensure not only the authenticity of the file, but also the program's permission to use the file.

What is claimed is:

1. A method of providing a file in response to a request, comprising:
   receiving, on a first computer system, the request for the file, the request comprising a message digest and a location corresponding to a second computer system other than the first computer system, the first computer system coupled to the second computer system over a network;
   determining whether a file having a hash result corresponding to the message digest was stored in a storage area prior to the receiving of said request step;
   responsive to the file having the hash result corresponding to the message digest being stored in the storage area prior to the receiving of said request step, providing the file from the storage area in response to the request; and
   responsive to no file having the hash result corresponding to the message digest being stored in the storage area prior to the receiving of said request step:
     retrieving the file from the second computer system responsive to the location;
     storing the file retrieved in the storage area;
     hashing the file using a hash function to produce a hash result;
     comparing the hash result with the message digest; and
     responsive to the hash result corresponding to the message digest, providing the file in response to the request.

2. The method of claim 1, wherein the stored file was received from a first Internet domain and is provided to a program supplied by a second Internet domain.

3. The method of claim 1, additionally comprising, responsive to the hash result not corresponding to the message digest, providing an error message.

4. The method of claim 3 wherein the file is not provided if the error message is provided.

5. The method of claim 1 wherein the hash function comprises a cryptographically secure hash function.

6. The method of claim 5 wherein the cryptographically secure hash function comprises SHA-1.

7. The method of claim 1, wherein the determining step is responsive to a plurality of files in the storage area, such files received from a plurality of Internet domains.

8. A system for providing a file in response to a request, comprising:
   a file request receiver on a first computer system, the file request receiver having a first input operatively coupled for receiving the request for the file, the request comprising a message digest and a location corresponding to a second computer system other than the first computer system, the first computer system coupled to the second computer system over a network, the file request receiver for providing at a first input/output the message digest;

a cache manager having a first input/output coupled to the file request receiver input/output for receiving the message digest, the cache manager for determining via a second input/output coupled to a storage area whether a file having a hash result corresponding to the message digest was stored in the storage area and for providing at the first input/output at least one selected from the group comprising:
- an identifier of said file responsive to the file being stored in the storage area; and
- an indication that said file is not stored in the storage area;

wherein the file request receiver is additionally for:
receiving the identifier of the file or the indication via the request receiver first input/output,
responsive to the identifier of the file, retrieving the file from the storage area via
a second input/output in response to the request and providing the file at a first output; and
responsive to the indication, providing the identifier of the file and the message digest at a second output; and additionally comprising:
a file retriever having an input coupled to the request receiver second output, the file retriever for retrieving the file via a first input/output from the second computer system responsive to identifier, storing the file retrieved in the storage area via a second input/output and providing an identifier of the file at an output;
a file hasher having an input coupled to the file retriever output for receiving the identifier of the file, the file hasher for hashing the file using a hash function to produce a hash result and for providing the hash result at an output;
a hash compare manager having an input coupled to the request receiver second output for receiving the message digest and to the file hasher output for receiving the hash result, the hash compare manager for comparing the hash result with the message digest and providing at an output an indication of the result of said comparison; and
wherein the file request receiver additionally comprises a second input coupled to the hash compare manager output for receiving the indication, and the file request receiver additionally provides the file at the file request receiver first output responsive to the indication indicating the hash result corresponds to the message digest.

9. The system of claim 8, wherein the stored file was received from a first Internet domain and is provided to a program supplied by a second Internet domain.

10. The system of claim 8, wherein the file request receiver is additionally for providing an error message at the file request receiver first output, responsive to the indication indicating that the hash result does not correspond to the message digest.

11. The system of claim 10 wherein the file is not provided by the file request receiver if the error message is provided.

12. The system of claim 8 wherein the hash function comprises a cryptographically secure hash function.

13. The system of claim 12 wherein the cryptographically secure hash function comprises SHA-1.

14. The system of claim 8, wherein the cache manager determined via the second input/output coupled to the storage area whether the file having a hash result corresponding to the message digest was stored in the storage area, responsive to a plurality of files in the storage area, such files received from a plurality of Internet domains.

15. A computer program product comprising a computer useable medium having computer readable program code embodied therein for providing a file in response to a request, the computer program product comprising computer readable program code devices configured to cause a computer system to:
receive, on a first computer system, the request for the file, the request comprising a message digest and a location corresponding to a second computer system other than the first computer system, the first computer system coupled to the second computer system over a network;
determine whether a file having a hash result corresponding to the message digest was stored in a storage area prior to the receiving of said request step;
responsive to the file having the hash result corresponding to the message digest being stored in the storage area prior to the receiving of said request step, provide the file from the storage area in response to the request; and
responsive to no file having the hash result corresponding to the message digest being stored in the storage area prior to the receiving of said request step:
retrieve the file from the second computer system responsive to the location;
store the file retrieved in the storage area;
hash the file using a hash function to produce a hash result;
compare the hash result with the message digest; and
responsive to the hash result corresponding to the message digest, provide the file in response to the request.

16. The computer program product of claim 15, wherein the stored file was received from a first Internet domain and is provided to a program supplied by a second Internet domain.

17. The computer program product of claim 15, additionally comprising computer readable program code devices configured to cause the computer system to, responsive to the hash result not corresponding to the message digest, provide an error message.

18. The computer program product of claim 17 wherein the computer program product causes the computer system not to provide the file if the error message is provided.

19. The computer program product of claim 15 wherein the hash function comprises a cryptographically secure hash function.

20. The computer program product of claim 19 wherein the cryptographically secure hash function comprises SHA-1.

21. The computer program product of claim 15, wherein the computer readable program code devices configured to cause the computer system to determine are is responsive to a plurality of files in the storage area, such files received from a plurality of Internet domains.

* * * * *

UNITED STATES PATENT AND TRADEMARK OFFICE
CERTIFICATE OF CORRECTION

PATENT NO. : 7,526,530 B2
APPLICATION NO. : 11/429380
DATED : April 28, 2009
INVENTOR(S) : Lee Thomason Page 1 of 1

It is certified that error appears in the above-identified patent and that said Letters Patent is hereby corrected as shown below:

Column 8, line 56, delete "is".

Signed and Sealed this

Seventeenth Day of November, 2009

David J. Kappos
*Director of the United States Patent and Trademark Office*